(12) United States Patent
Nowak et al.

(10) Patent No.: US 10,724,119 B2
(45) Date of Patent: Jul. 28, 2020

(54) PROCESS FOR THE SEPARATION OF VANADIUM

(71) Applicant: SMS GROUP PROCESS TECHNOLOGIES GMBH, Vienna (AT)

(72) Inventors: Benedikt Nowak, Vienna (AT); Herbert Weissenbaeck, Vienna (AT)

(73) Assignee: SMS GROUP PROCESS TECHNOLOGIES GMBH, Vienna (AT)

( * ) Notice: Subject to any disclaimer, the term of this patent is extended or adjusted under 35 U.S.C. 154(b) by 0 days.

(21) Appl. No.: 16/080,872

(22) PCT Filed: Feb. 28, 2017

(86) PCT No.: PCT/EP2017/054608
§ 371 (c)(1),
(2) Date: Aug. 29, 2018

(87) PCT Pub. No.: WO2017/148922
PCT Pub. Date: Sep. 8, 2017

(65) Prior Publication Data
US 2019/0093194 A1 Mar. 28, 2019

(30) Foreign Application Priority Data
Mar. 1, 2016 (EP) ..................... 16158032

(51) Int. Cl.
*C22B 34/22* (2006.01)
*C22B 3/44* (2006.01)

(52) U.S. Cl.
CPC ............... *C22B 34/22* (2013.01); *C22B 3/44* (2013.01); *Y02P 10/234* (2015.11)

(58) Field of Classification Search
CPC ..................................................... C22B 34/22
See application file for complete search history.

(56) References Cited

U.S. PATENT DOCUMENTS

| 3,190,720 A | 6/1965 | Goren et al. |
| 4,849,189 A | 7/1989 | Jansz |
| 2013/0195738 A1 | 8/2013 | Harris et al. |

FOREIGN PATENT DOCUMENTS

| CN | 102424914 B | 12/2013 |
| EP | 0 225 674 A2 | 6/1987 |

(Continued)

OTHER PUBLICATIONS

International Search Report dated May 22, 2017 in PCT/EP2017/054608 filed Feb. 28, 2017.

(Continued)

*Primary Examiner* — Melissa S Swain
(74) *Attorney, Agent, or Firm* — Oblon, McClelland, Maier & Neustadt, L.L.P.

(57) ABSTRACT

The present invention relates to a process for the separation of vanadium in the form of vanadium oxide, iron-vanadium-oxide, or iron-vanadium from solutions containing both dissolved iron and dissolved vanadium, wherein an aqueous solution containing dissolved iron and vanadium in a molar iron-to-vanadium ratio of above 1:1, preferably above 1:1 and up to 10000:1, more preferably between 5:1 and 1000:1, even more preferably between 5:1 and 100:1, and most preferably between 10:1 and 50:1 and optionally also other elements is oxidized in an oxidation step with a gaseous oxidation media, and wherein the amount of acid in the aqueous solution is kept below the stoichiometric amount of acid required during bivalent iron oxidation and the precipitate thus formed is removed from the solution.

8 Claims, 1 Drawing Sheet

(56) References Cited

FOREIGN PATENT DOCUMENTS

| | | |
|---|---|---|
| GB | 2 456 537 | 7/2009 |
| GB | 2 456 537 A | 7/2009 |

OTHER PUBLICATIONS

Chen, D. et al., "A novel process for recovery of iron, titanium, and vanadium from titanomagnetite concentrates: NaOH molten salt roasting and water leaching processes," Journal of Hazardous Materials, 244-245, 2013, pp. 588-595.

Chen, D. et al., "An extraction process to recover vanadium from low-grade vanadium-bearing titanomagnetite," Journal of Hazardous Materials, 294, 2015, pp. 35-40.

Zhao, L. et al., "A novel method to extract iron, titanium, vanadium, and chromium from high-chromium vanadium-bearing titanomagnetite concentrates," Hydrometallurgy, 149, 2014, pp. 106-109.

Ma, Y. et al., "Separation of V(IV) and Fe(III) from the acid leach solution of stone coal by D2EHPA/TBP," Hydrometallurgy, 153, 2015, pp. 38-45.

Stumm, W. et al., "Oxygenation of ferrous iron," Industrial and Engineering Chemistry, 53(2), 1961, pp. 143-146.

Vracar, R.Z. et al., "Kinetics of oxidation of Fe(II) ions by gaseous oxygen at high temperatures in an autoclave," Hydrometallurgy 44, 1997, pp. 113-124.

Swaminathan, K. et al., "The pressure oxidation of acidic $FeCl_2$ solution with oxygen," Hydrometallurgy, 6, 1981, pp. 339-346.

Morgan, B. et al., "The effect of pH on the kinetics of spontaneous Fe(II) oxidation by O2 in aqueous solution—basic principles and a simple heuristic description," Chemosphere, 68(11), 2007, pp. 2080-2084.

Sedneva, T. et al., "Decomposing the Titaniferous Magnetite Concentrate with Hydrochloric Acid," Theoretical Foundations of Chemical Engineering, Nauka/Interperiodica, MO, vol. 45, No. 5, Oct. 2011, XP019964288, pp. 753-763.

Second Office Action as received in the corresponding Chinese Patent Application No. 2017800144940 dated Apr. 14, 2020 w/English translation, 12 pages.

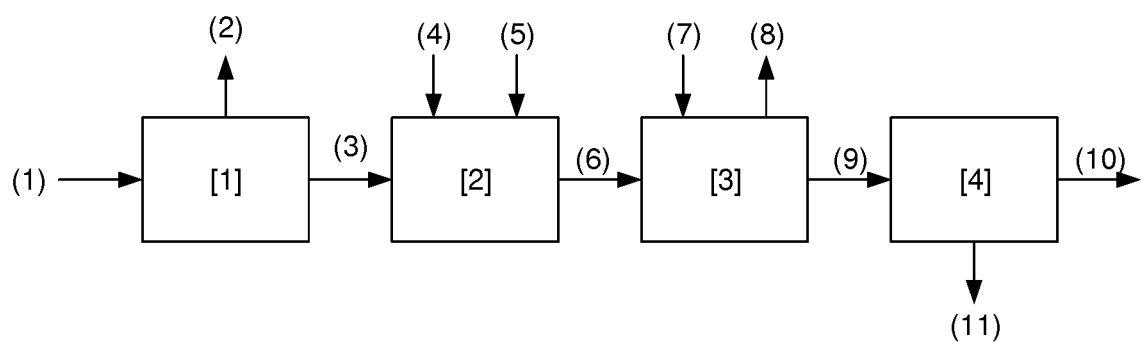

PROCESS FOR THE SEPARATION OF VANADIUM

The present invention relates to a process for the separation of vanadium in the form of vanadium oxide, iron-vanadium-oxide, or iron-vanadium from solutions containing both dissolved iron and dissolved vanadium, which solutions can stem from various sources.

Common raw materials used for the vanadium production involve titanomagnetite ores, vanadium slags e.g. from pig iron oxidation, oil combustion residues, spent catalysts, and others. Most of these raw materials are processed with the so-called salt roast process.

In the salt roast process, the vanadium slag or other vanadium concentrate, is mixed with alkali salts, then roasted, and the sodium meta vanadate formed is leached with water. This vanadate is then precipitated as ammonium metavanadate or ammonium polyvanadate.

Another possibility for vanadium winning is acid processing, according to which vanadium containing residues, such as oil residues, are leached with sulfuric acid, if necessary under reducing conditions with $SO_2$. The vanadium itself is precipitated after chemical oxidation, e.g. with $NaClO_3$, and neutralization.

Nowadays, the biggest portion of vanadium obtained is used for ferrovanadium production. Commercially available ferrovanadium consists of 40-80% vanadium and is produced from vanadium oxides and steel by means of aluminothermic reduction in an electric arc furnace (when in the following reference is made to a percentage, unless otherwise indicated, % by mass is meant).

For the separation of vanadium from low grade resources, several new processes have been proposed, e.g. slag roasting with NaOH followed by leaching with water (see reference document 1, in the following referred to as /1/); partial reduction of titanomagnetite, leaching with hydrochloric acid followed by reduction of $Fe^{3+}$ with iron to $Fe^{2+}$, solvent extraction of vanadium, and oxidative precipitation with $NaClO_3$ and ammonia /2/, optionally with a magnetic separation step subsequent to reduction /3/, or separation of $Fe^{3+}$ by solvent extraction /4/.

Ferrous ions (bivalent iron ions) can be oxidized with gaseous oxygen to ferric ions /5-8/. At higher pH values, that is without acid, ferric oxides will precipitate as well /7/. The governing reaction for low pH values, i.e. with acid (indicated as $H^+$ ion) present, is

$$Fe^{2+}+H^++\tfrac{1}{4}O_2\rightarrow Fe^{3+}+\tfrac{1}{2}H_2O \qquad \text{oxidation reaction 1.}$$

If no acid is present, hydrolysis of iron occurs with the formation of ferric oxide,

$$2Fe^{3+}+3H_2O\rightarrow Fe_2O_3+6H^+ \qquad \text{hydrolysis reaction 2,}$$

whereas the specific form of iron oxide (here: $Fe_2O_3$) depends on various conditions, and whereas the $H^+$ ions formed during hydrolysis are in turn consumed by the oxidation reaction 1.

EP 0 255 674 A2 discloses a two stage oxidation process for the separation of pentavalent vanadium from spent catalysts. In the first oxidation step, a pH of 0.7-1.4P to 2.3-1.4P (P refers to the oxygen partial pressure in MPa), an oxygen partial pressure of 0.05 to 1.0 MPa, and a temperature of 15 to 70° C. have been found as working condition; in the second oxidation step, the pH is slightly higher being 3.2-1.4P to 2.3-1.4P, the oxygen partial pressure is 0.07 to 0.5 MPa, and the process temperature is in the range of 70 to 110° C. In both steps, the pH is preferably kept constant by addition of a base. According to this document, filterability of the solution is optimized if ferric ions are present at least in the second oxidation step. Therefore, if not already present, ferric or ferrous compounds are added in order to yield a molar iron-to-vanadium ratio of 1:200 to 1:1, whereas 1:50 to 1:3 is preferred. In example 1, run b and c, the iron-to-vanadium ratio is 1:32; 97-99% of vanadium are precipitated as solid pentavalent vanadium.

The aim of the present invention is to provide a new process for the separation of vanadium out of solutions containing both dissolved iron and dissolved vanadium, which solutions can stem from various sources. Such a process is characterised in that an aqueous solution containing dissolved iron and vanadium in a molar iron-to-vanadium ratio of above 1:1, preferably above 1:1 and up to 10000:1, more preferably between 5:1 and 1000:1, even more preferably between 5:1 and 100:1, and most preferably between 10:1 and 50:1 and optionally also other elements, is oxidized in an oxidation step with a gaseous oxidation media, wherein the amount of acid in the aqueous solution is kept below the stoichiometric amount of acid required during bivalent iron oxidation, and the precipitate thus formed is removed from the solution. By "molar iron-to-vanadium ratio of above 1:1" it is understood that in the solution to be processed according to the present invention there is always a higher molar amount of dissolved iron than of dissolved vanadium. In contrast, as mentioned above, the process according to EP 0 255 674 A2 is designed for processing a solution with a molar iron-to-vanadium ratio of 1:200 to 1:1, meaning that in such a solution there is always much less dissolved ion than dissolved vanadium present.

The core of the present invention is the oxidation process and the amount of acid present in the solution during said oxidation process. Generally spoken, if no acid is present during oxidation reaction 1, virtually all of the vanadium and about a third of the bivalent iron content of the solution will precipitate. On the other hand, if a stoichiometric surplus of acid is present during the oxidation process, no precipitation will occur at all. It has now surprisingly been found that if the amount of acid in the aqueous solution is kept below the stoichiometric amount of acid required during bivalent iron oxidation, any acid present will be consumed according to oxidation reaction 1 by the formation of $Fe^{3+}$ and large amounts of vanadium but only small amounts of the iron content of the solution will precipitate. The amount of acid in the aqueous solution is kept according to the present invention below the stoichiometric amount of acid required during the oxidation process, i.e. between 0 and almost 100% (i.e. 99.9%), preferably between 10% and almost 100%, between 20% and almost 100%, between 30% and almost 100%, between 40% and almost 100%, between 50% and almost 100%, between 60% and almost 100%, between 70% and almost 100%, between 80 and almost 100%, and between 90% and almost 100% of the stoichiometric amount of acid required during the oxidation process. Thus, an aqueous solution containing dissolved iron, vanadium and optionally also other elements can be oxidized with a gaseous oxidation media, such as air or pure oxygen and vanadium can be separated.

According to a preferred embodiment of the present invention, the formed precipitate is removed from the solution by a solid/liquid separation process. For such a removal almost any process known in the state of the art might be suitable, preferably the removal is carried out by filtration or centrifugation.

Preferably for the said oxidation step, where a solution containing dissolved iron, vanadium, and other elements is oxidized, the reaction temperature is below 400° C., preferably between 100 and 300° C. and more preferably between 120 and 200° C.

According to a further embodiment of the present invention, the gaseous oxidation media is selected from gas mixtures comprising inert gases together with various amounts of oxygen, like for instance air, mixtures of air and oxygen and pure oxygen.

In a still further preferred embodiment, the oxidation step is carried out at an operating pressure above the solution's vapor pressure at the temperature of choice, the surplus allowing for the oxidation. The residence time of the solution in said oxidation process depends on several variables such as, but not limited to, gas/liquid mass transfer. Therefore, the required residence time of the solution in the oxidation process depends on the setup of choice and the specific reaction conditions.

Preferably the aqueous solution is preconcentrated prior to the oxidation step.

FIG. 1 as enclosed shows a flow chart for the process according to the invention. A solution (1) stemming from upstream processing (which can be, but is not limited to, an acid leaching process) contains dissolved iron, vanadium, and other elements. Optionally, this solution is preconcentrated in a pre-concentration step [1] by means of evaporation by raising temperature and/or reducing pressure in order to reduce the volume of the solution and, if the solution contains acid in form of a dissolved gas (such as, but not limited to, HCl), to evaporate at least part of this acid.

In the next process step [2], the acid content of the preconcentrated solution (3), or, if no preconcentration step [1] is used, the acid content of the original solution (1), is adjusted. If the solution subject to oxidation contains only small amounts of acid and high amounts of bivalent iron, and if therefore the precipitation of high amounts of iron oxide according to reaction 2 as shown above is expected, then further acid (4) is added to the solution in order to provide for sufficient acid. If the solution subject to oxidation contains only small amounts of bivalent iron, leading to acceptable low amounts of iron oxide formed according to reaction 2 as shown above, the addition of additional acid can also be omitted. The total amount of acid present in the solution is in any case below the stoichiometric amount required by reaction 1 shown above. If the solution subject to oxidation contains such amounts of acid that no iron will precipitate according to reaction 1, then a base or equivalent means can be added in order to reduce the amount of acid to less than the stoichiometric amount required by reaction 1.

The thus acid-adjusted solution (6) is then sent to an oxidation step [3]. The oxidation media (7) used in this oxidation step is gaseous pure oxygen or a gas containing oxygen such as, but not limited to, air. If the oxidation media (7) is not pure oxygen, then off-gas (8) containing unreacted oxygen, inert compounds, and vapours is produced during the oxidation step. The oxidation media (7) is preferably intensively contacted with the acid adjusted aqueous solution (6), preferably the oxidation step takes place in a gas/liquid reactor which also can be pressurised. During this oxidation step, the oxidation and partly precipitation of iron as iron oxide, the consumption of acid, and the precipitation of vanadium as vanadium oxide or iron-vanadium-oxide takes place, thus forming stream (9) as the product of the oxidation step, which stream (9) comprises, a suspension of precipitated particles in the oxidized solution.

The precipitated particles are then removed from stream (9) in step [4], which is a solid/liquid separation step, such as, but not limited to, filtration or centrifugation. From stream (9), the solids (11) are separated, and filtrate (10), which still contains dissolved trivalent iron ions, is sent to further treatment steps or is recycled to upstream processes. The solids (11) thus obtained in step [4] can be further washed with water, if required.

Depending on the desired end product, there are several applications of the present invention:

In one embodiment of the present invention, the washed solids (11) obtained in step [4] of the process of the present invention are then further processed according to methods known in the state of the art, for instance extracted with caustic soda. Vanadium will dissolve and ferric oxide(s) will remain solid. The dissolved vanadium is then precipitated by means of pH adjustment and ammonium addition to the solution, the ammonium-precipitate thus obtained is subsequently dried, heated for driving off ammonia and giving vanadium pentoxide, and flaked in order to bring it into a commercially accepted form.

In another embodiment of the present invention, the solids (11) obtained in step [4] of the process of the present invention form a filter cake, which filter cake is used as feed material for the salt roast process known in the state of the art.

In still another embodiment of the present invention, the solids (11) obtained in step [4] of the process of the present invention form a filter cake which is washed and dried. The washed and dried filter cake is then mixed with vanadium oxide(s) to adjust the iron-to-vanadium-ratio. The obtained mixture is then reduced by conventional processes, e.g. with aluminum in an electric arc furnaces or by other means forming ferrovanadium and a slag containing e.g. aluminum oxide.

The present invention will now be explained by means of the following examples, to which examples the present invention, however, shall not be limited. This specifically regards the use of HCl as acid in the examples below, which hydrochloric acid might also be substituted by a different suitable acid, like for instance sulphuric acid or nitric acid.

EXAMPLE 1 (COMPARATIVE EXAMPLE)

An aqueous solution containing 34 wt % $FeCl_2$, 9 wt % $FeCl_3$, 10 wt % HCl, 2 wt % $MgCl_2$, 0.2 wt % $VCl_3$, and 0.9 wt % other chlorides has been prepared (molar iron-to-vanadium ratio=255:1). The solution was heated in an autoclave to 150° C. and oxygen gas was introduced as oxidation media for the oxidation step. The total pressure within the autoclave was approx. 5 bar(g), with an initial vapour pressure of the aqueous solution at the chosen temperature of approx. 3.5 bar(g), where bar(g) here and in the following refers to bar above atmospheric pressure. At the end of the oxidation step, no solids were found in the oxidised solution, the entire amount of ferrous chloride $FeCl_2$ has been converted to ferric chloride $FeCl_3$ and no vanadium precipitated. Regarding molar amounts, the initial concentration of $FeCl_2$ was 0.27 mol per 100 g solution and the initial concentration of HCl was 0.28 mol per 100 g solution (i.e. 102% acid of the stoichiometric amount required). No oxide precipitated from the solution during the oxidation step.

EXAMPLE 2

An aqueous solution containing 31 wt % $FeCl_2$, 8 wt % HCl, 1 wt % $MgCl_2$, 0.8 wt % $VCl_3$, and 0.5 wt % $AlCl_3$ was prepared (molar iron-to-vanadium ratio=48:1). This solution was heated in an autoclave to 150° C. and oxygen gas was introduced as oxidation media for the oxidation step. The total pressure within the autoclave was approx. 5 bar(g), with an initial vapour pressure of the aqueous solution at the chosen temperature of approx. 2.6 bar(g). The molar amount of HCl as present in the starting solution was below the molar amount of $FeCl_2$ (90% acid of the stoichiometric amount required), and therefore at the end of the oxidation step and after filtration, a filter cake formed by the precipitates could be separated from the oxidized solution. This filter cake was washed with water and then dried. The dried filter cake contained 29 wt % Fe, 26 wt % V, 0.9 wt % Al, and 0.01 wt % Mg. Phase analysis of the filter cake revealed a major amount of the solid contents being present in the form of iron vanadate (triclinic $FeVO_4$).

The aqueous solution that has been used in this example initially contained 5.7 g of dissolved vanadium. The major amount of this vanadium ended up in the filter cake; in the filtrate and in the wash water, 0.09 g (that is 2% of 5.7 g) and 0.006 g (that is 0.1% of 5.7 g) vanadium, respectively, was found.

EXAMPLE 3

An aqueous solution containing 33 wt % $FeCl_3$, 5 wt % $FeCl_2$, 0.6 wt % HCl, 1 wt % $MgCl_2$, 0.8 wt % $VCl_3$, and 0.5 wt % $AlCl_3$ was prepared (molar iron-to-vanadium ratio=48:1). The solution was heated in an autoclave to 150° C. and oxygen gas was introduced as oxidation media for the oxidation step. The total pressure within the autoclave was approx. 5 bar(g) with an initial vapour pressure of the aqueous solution at the chosen temperature of approx. 1.5 bar(g). The molar amount of HCl as present in the starting solution was below the molar amount of $FeCl_2$ (42% acid of the stoichiometric amount required), and therefore at the end of the oxidation step and after filtration, a filter cake formed by the precipitates could be separated from the oxidized solution. This filter cake was washed with water and then dried. The dried filter cake contained 29 wt % Fe, 27 wt % V, 1.5 wt % Al, and Mg below limit of detection. Scanning electron microscope images revealed a similar appearance as the filter cake from Example 2 above.

The aqueous solution that has been used in this example initially contained 4 g dissolved vanadium. The major amount of this vanadium ended up in the filter cake; in the filtrate and in the wash water, 0.2 g (that is 5% of 4 g) and 0.01 g (that is 0.3% of 4 g) vanadium, respectively, was found.

EXAMPLE 4

1.7 g of the washed and dried filter cake from Example 3 was leached with 12.8 g caustic soda (25 wt % NaOH) at 100° C. The remaining solids ("iron oxide") were separated with a centrifuge and washed with water, which washing water was then added to the filtrate. The combined filtrates were then neutralized slowly with hydrochloric acid (37 wt % HCl), and at a pH of 11 approx. 2 mL of ammonia (32 wt % $NH_3$) were added. Then, further hydrochloric acid was added and at a pH of 7.8, the addition of acid was stopped. The precipitate thus formed was filtered off and dried ("vanadium product").

Regarding the contents of iron and vanadium, the solids separated by the centrifuge in example 4 ("iron oxide") contained 43 wt % Fe and 0.2 wt % V, while the product obtained from the filtrate after neutralisation ("vanadium product") contained 56 wt % V and 0.2 wt % Fe. Phase analysis of the iron oxide revealed that mainly hematite was formed.

EXAMPLE 5

Example 2 was repeated at different operating conditions: The oxidation step was carried out at 130° C. and a total pressure of approx. 3.5 bar(g). The initial vapour pressure of the aqueous solution at the chosen temperature was approx. 1.3 bar(g). The filter cake formed by the precipitates contained 34 wt % Fe, 26 wt % V, 0.02 wt % Al, and 0.00 wt % Mg.

In this example, the aqueous solution contained initially 3.9 g of dissolved vanadium. 2.9 g vanadium ended up in the filter cake (73% of 3.9 g).

EXAMPLE 6

An aqueous solution containing 39 wt % $FeCl_2$, 3.5 wt % HCl, 0.07 wt % $VCl_3$, and traces of other metal chlorides was prepared (molar iron-to-vanadium ratio=8500:1). The solution was heated in an autoclave to 150° C. and oxygen gas was introduced as oxidation media for the oxidation step. The total pressure within the autoclave was approx. 7 bar(g). The molar amount of HCl as present in the starting solution was below the molar amount of $FeCl_2$ (31% acid of the stoichiometric amount required), and therefore at the end of the oxidation step and after filtration, a filter cake formed by the precipitates could be separated from the oxidized solution. Almost the entire amount of vanadium ended up in the filter cake; in the aqueous solution, it was found to be below its limit of quantification.

REFERENCES

1. Desheng Chen, Longsheng Zhao, Yahui Liu, Tao Qi, Jianchong Wang, and Lina Wang. A novel process for recovery of iron, titanium, and vanadium from titanomagnetite concentrates: NaOH molten salt roasting and water leaching processes. Journal of Hazardous Materials, 244-245:588-595, 2013.
2. Desheng Chen, Hongxin Zhao, Guoping Hu, Tao Qi, Hongdong Yu, Guozhi Zhang, Lina Wang, and Weijing Wang. An extraction process to recover vanadium from low-grade vanadium-bearing titanomagnetite. Journal of Hazardous Materials, 294:35-40, 2015.
3. Longsheng Zhao, Lina Wang, Tao Qi, Desheng Chen, Hongxin Zhao, and Ya-hui Liu. A novel method to extract iron, titanium, vanadium, and chromium from high-chromium vanadium-bearing titanomagnetite concentrates. Hydrometallurgy, 149:106-109, 2014.
4. Yiqian Ma, Xuewen Wang, Mingyu Wang, Changjun Jiang, Xiaoyan Xiang, and Xiaolin Zhang. Separation of V(IV) and Fe(III) from the acid leach solution of stone coal by D2EHPA/TBP. Hydrometallurgy, 153:38-45, 2015.
5. Werner Stumm and G. Fred Lee. Oxygenation of ferrous iron. Industrial and Engineering Chemistry, 53(2):143-146, 1961.
6. R. Z. Vracar and K. P. Cerovic. Kinetics of oxidation of Fe(II) ions by gaseous oxygen at high temperatures in an autoclave. Hydrome, 44:113-124, 1997.
7. K. Swaminathan, C. Subramanian, and Ch. Sridhar Rao. The pressure oxidation of acidic $FeCl_2$ solution with oxygen. Hydro, 6:339-346, 1981.

8. Barak Morgan and Ori Lahav. The effect of pH on the kinetics of spontaneous Fe(II) oxidation by $O_2$ in aqueous solution—basic principles and a simple heuristic description. Chemosphere, 68(11):2080-2084, 2007.
9. Jansz, Just Jan Christiaan, Vanadium recovery process. EP 0 225 674 A2 (SHELL INT RESEARCH [NL]). 16 Jun. 1987.

The invention claimed is:

1. A process for separating vanadium in the form of vanadium oxide, iron-vanadium-oxide, or iron-vanadium from solutions containing both dissolved iron and dissolved vanadium, the method comprising
    oxidizing an aqueous solution containing dissolved iron and vanadium in a molar iron-to-vanadium ratio of above 1:1, and optionally also other elements at a reaction temperature of between 100 and 300° C. with a gaseous oxidation media, wherein acid is present in the aqueous solution during the oxidation and the acid is kept in an amount below the stoichiometric amount of acid required during bivalent iron oxidation, and
    removing precipitate thus formed from the aqueous solution.

2. The process according to claim 1, wherein the removing the precipitate from the solution comprises a solid/liquid separation process.

3. The process according to claim 1, wherein the reaction temperature is from 120° C. to 200° C.

4. The process according to claim 1, wherein the gaseous oxidation media is a gas mixture comprising inert gas and oxygen.

5. The process according to claim 1, wherein the gaseous oxidation media comprises air, mixtures of air and oxygen, and pure oxygen.

6. The process according to claim 1, wherein the oxidizing is carried out at an operating pressure above the aqueous solution's vapor pressure at the reaction temperature.

7. The process according to claim 1, wherein the aqueous solution is preconcentrated prior to the oxidizing.

8. The process according to claim 1, wherein the acid in the aqueous solution is controlled by adding a base to the aqueous solution.

* * * * *